UNITED STATES PATENT OFFICE.

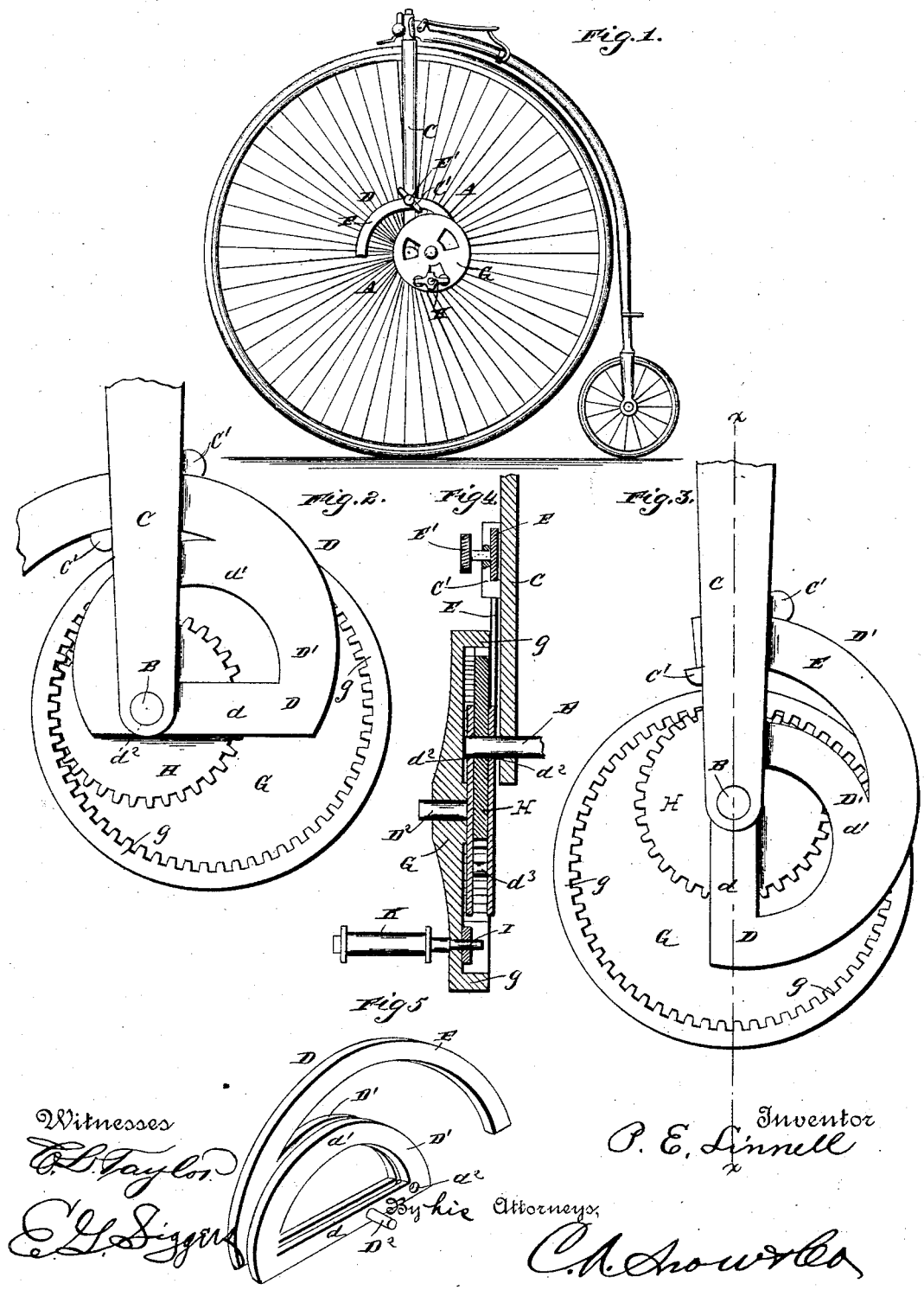

UNITED STATES PATENT OFFICE.

PHILETUS EDWARD LINNELL, OF CHARLOTTE, NORTH CAROLINA.

SPEED-GEARING FOR BICYCLES.

SPECIFICATION forming part of Letters Patent No. 362,220, dated May 3, 1887.

Application filed February 25, 1887. Serial No. 228,897. (No model.)

*To all whom it may concern:*

Be it known that I, PHILETUS EDWARD LINNELL, a citizen of the United States, residing at Charlotte, in the county of Mecklenburg and State of North Carolina, have invented a new and useful Improvement in Speed-Gearing for Bicycles, of which the following is a specification.

My invention relates to an improvement in speed-gearing for bicycles; and it consists in a certain novel construction and arrangement of parts for service, fully set forth hereinafter, and specifically pointed out in the claims.

My object is to provide means whereby the speed of the bicycle may be multiplied, in which the necessary gearing shall be very compactly arranged, light, easy-running, and generally effective; also, to provide means whereby the distance from the seat of the bicycle to the center on which the pedals revolve may be regulated at will to suit the reach of the operator.

In order that my invention may be more fully understood and the advantages thereof better appreciated I illustrate my improved speed-gearing in the accompanying drawings, in which—

Figure 1 is a side elevation of a bicycle provided with my improvements. Fig. 2 is a view of the inside of the gearing attachment. Fig. 3 is a similar view with the machine adjusted for a longer reach. Fig. 4 is a detail transverse section on the line $x\,x$, Fig. 3. Fig. 5 is a detail perspective view of the stirrup detached from the other parts of the invention.

Referring to the drawings, in which similar letters denote corresponding parts in all the figures, A designates the driving-wheel of a bicycle, having the axle B, which is journaled in the lower end of the forks C, and is extended for a short distance on each side thereof, and D is the stirrup journaled on said extensions and comprising the two side plates, D' D', segmental in form, having the straight portion $d$ and the integral curved portion $d'$.

$d^2\,d^2$ represent the aligned openings or bearings near one end of the straight portions $d$ of the segmental plates, in which operates the axle B of the machine, and E represents a curved arm formed integrally with the inner of the plates D', and extending upwardly from the curved portion $d'$ thereof, said arm E being an arc of a circle described around the bearing $d^2$ in the said plate.

The curved arm E passes through a guide-loop, C', on the fork of the bicycle, and the said loop is rigidly secured at any point of the said arm by screwing the thumb-screw E' tightly down thereon.

The plates D' of the stirrup are secured rigidly a short distance apart by the rivets or bolts $d^3$, and a stud, $d^2$, is formed or secured on the outside of the outer plate, D', about the center of the straight arm thereof, which stud serves as the axle of the internal gear-wheel, G. Said wheel has the inwardly-extending toothed flange $g$, which teeth are adapted to gear with the teeth of the pinion-wheel H, rigidly secured to the axle B of the machine between the side plates, D', of the stirrup D.

On the outside of the internal gear-wheel G is formed or secured the treadle-pin I, on which rotates the treadle K, of any preferred form.

It will be seen that as the gear-wheel G is turned by means of the treadle thereon the pinion H, which is much smaller, will be rotated in the same direction very much faster than the gear G, and as the pinion H is secured to the axle of the machine, the driving-wheel A will be rotated at a much greater speed than the treadles are moved. The gearing is also very direct, there being no sprocket-gearing to loosen the power, the treadle gear-wheel operating directly on the pinion attached to the main axle of the machine, and there is therefore very little power lost by friction.

It will be readily understood by comparing Figs. 2 and 3 that if the loop C' is secured to the arm E near the rear end the bearing of the internal gear-wheel, G, will be directly in rear of the axle B of the machine, as seen in Fig. 2, and if said loop is secured to the arm E near the front end thereof, the said bearing of the wheel G will be vertically under the said axle, thus lengthening considerably the reach from the seat of the machine to the axis of the motion of the treadles, thus allowing for adjustment to the requirements of the operator. Thus I provide a means of adjusting the reach of the machine which will not affect the power thereof, and which, in lengthening said reach, does not also lengthen the throw of the treadles—that is, the distance of said treadles from the axis of their motion—thereby increasing the amount of motion necessary to be made to produce the same result. This gear attachment may also be much more cheaply manufactured than the previous forms of gears, in that the construction is simpler, and will also be found less likely to get out of order than the said forms, from the fact of said simpleness, and that the gears are concealed and thus protected from dirt and other damage.

I claim—

1. In a bicycle, the power-wheel A, having the axle B, and the stirrup D, comprising the side plates, D', journaled on the said axle, combined with the toothed pinion H, rigidly secured to said axle and rotating between the plates D', and the internal gear-wheel, G, having the treadles attached thereto and adapted to engage with the pinion H, substantially as described.

2. In a bicycle, the main axle B and the stirrups D, comprising the parallel side plates, D' D', having the stud $D^2$ on the outside of the outer plate, combined with the pinion H, secured to said axle B and operating between said side plates, D', and the internal gear-wheel, G, to mesh with said pinion and journaled on the stud $D^2$, substantially as described, for the purpose set forth.

3. In a bicycle, the driving-wheel A, having the axle B, and the forks C, secured at the lower ends to said axle, combined with the double stirrup D, comprising the segmental side plates, D', rigidly secured a short distance apart, the curved arm E, formed integrally with the inner plate, D', and extending through a guide-loop, C', on the fork C, and the gear-wheel G, journaled on the outside of said stirrup and engaging with a pinion, H, rigidly secured to the axle B, substantially as described.

4. In a bicycle, the main axle B and forks C, secured at the lower ends thereon, combined with the double stirrup D, comprising the parallel segmental plates D' D', rigidly held a short distance apart by rivets passed therethrough, curved arm E, formed integrally with the inner of said plates, guide-loop C' on the fork C, adapted to receive said arm E, the thumb-screw E' to clamp said loop to any point of said arm, and the gear-wheel H, secured to the axle B and adapted to mesh with the internal gear, G, journaled on a pivot on the outer side of the stirrup, substantially as described.

5. In a bicycle, the axle B, forks C, journaled at the lower ends on said axle and having the guide-loop C', provided with a set-screw, E', pinion H, rigidly secured to said axle, double stirrup D, comprising plates D' D', journaled to the axle B on opposite sides of the pinion H, and having curved arm E, concentric with the pinion H, and adapted to pass through the loop C' and be secured by the set-screw E', internal gear-wheel, G, journaled on a stud formed on the outside of said stirrup eccentric with the pinion H, said gear G being adapted to engage with the said pinion, substantially as described, for the purpose set forth.

In testimony that I claim the foregoing as my own I have hereto affixed my signature in presence of two witnesses.

PHILETUS EDWARD LINNELL.

Witnesses:
H. C. SEVERS,
A. B. HUSTON.